US011932328B2

(12) United States Patent
Pettersson et al.

(10) Patent No.: US 11,932,328 B2
(45) Date of Patent: Mar. 19, 2024

(54) TRACK ASSEMBLY AND A TRACK DRIVEN VEHICLE EQUIPPED WITH SUCH A TRACK ASSEMBLY

(71) Applicant: Komatsu Forest AB, Umeå (SE)

(72) Inventors: Henry Pettersson, Täfteå (SE); Espen Miland, Hörnefors (SE)

(73) Assignee: Komatsu Forest AB, Umeå (SE)

(*) Notice: Subject to any disclaimer, the term of this patent is extended or adjusted under 35 U.S.C. 154(b) by 625 days.

(21) Appl. No.: 17/058,052

(22) PCT Filed: May 8, 2019

(86) PCT No.: PCT/SE2019/050409
§ 371 (c)(1),
(2) Date: Nov. 23, 2020

(87) PCT Pub. No.: WO2019/231374
PCT Pub. Date: Dec. 5, 2019

(65) Prior Publication Data
US 2021/0155302 A1 May 27, 2021

(30) Foreign Application Priority Data
May 28, 2018 (SE) .................................. 1850644-4

(51) Int. Cl.
*B60K 6/00* (2006.01)
*B60K 7/00* (2006.01)
(Continued)

(52) U.S. Cl.
CPC ................ *B62D 55/10* (2013.01); *B60K 6/00* (2013.01); *B60K 7/0015* (2013.01);
(Continued)

(58) Field of Classification Search
CPC ...... A01G 23/006; B60K 6/00; B60K 7/0007; B60K 7/0015; B60K 17/046;
(Continued)

(56) References Cited

U.S. PATENT DOCUMENTS 3,398,806 A  8/1968  Hendricks
3,645,350 A  2/1972  Deli et al.
(Continued)

FOREIGN PATENT DOCUMENTS

CN  202175123 U  3/2012
CN  106080821 A  11/2016
GB     128280 A   6/1919

OTHER PUBLICATIONS

European Search Report issued for European Patent Application No. 19811356.5, dated Jan. 20, 2022 in 5 pages.
(Continued)

*Primary Examiner* — Jacob D Knutson
*Assistant Examiner* — Felicia L. Brittman
(74) *Attorney, Agent, or Firm* — Knobbe, Martens, Olson & Bear, LLP (57) ABSTRACT

A track assembly (15) for a track-driven vehicle, whereby the track-carrying beam (15) is arranged to hold a front and a rear wheel (16), one of which is driving, a plurality of carrying wheels about which wheels a continuous track travels, the track-carrying beam (15) is elongated and terminated by a first and a second gable end. The track-carrying beam (15) comprises an integrated compartment (37) and an opening (36) in one (35) of said gables, whereby the compartment (37) communicates with the surroundings via said opening (36), and whereby the opening (36) is arranged to allow for insertion of a transmission device for driving of said driving wheel (16) via the opening (36) in the compartment (37).

15 Claims, 4 Drawing Sheets

(51) Int. Cl.
  *B62D 55/065* (2006.01)
  *B62D 55/10* (2006.01)
  *B62D 55/125* (2006.01)
  *B62D 55/14* (2006.01)
  *B62D 55/24* (2006.01)
  *A01G 23/00* (2006.01)
  *B60K 17/04* (2006.01)

(52) U.S. Cl.
  CPC ........... *B62D 55/125* (2013.01); *B62D 55/14* (2013.01); *B62D 55/244* (2013.01); *A01G 23/006* (2013.01); *B60K 7/0007* (2013.01); *B60K 2007/0076* (2013.01); *B60K 17/046* (2013.01); *B60Y 2200/20* (2013.01); *B62D 55/0655* (2013.01)

(58) Field of Classification Search
  CPC .. B60K 2007/0076; B60K 17/14; B60K 1/00; B60K 2007/0061; B60K 17/043; B60K 17/10; B60K 2007/0069; B60K 7/00; B62D 55/10; B62D 55/14; B62D 55/065; B62D 55/125; B62D 55/244; B62D 55/0655; B60Y 2200/20; B60Y 2200/25; B60Y 2200/417
  USPC .................................................. 180/9.1, 9.62
  See application file for complete search history.

(56) References Cited

U.S. PATENT DOCUMENTS

| | | |
|---|---|---|
| 4,304,313 A | 12/1981 | van der Lely |
| 4,821,824 A | 4/1989 | Gilbert |
| 5,894,908 A | 4/1999 | Eftefield |
| 6,209,669 B1 | 4/2001 | Young |
| 2005/0155798 A1 | 7/2005 | Chang et al. |
| 2018/0099707 A1* | 4/2018 | Hellholm ............. B62D 55/092 |

OTHER PUBLICATIONS

International Search Report for International Application No. PCT/SE2019/050409, dated Aug. 2, 2019 in 4 pages.

* cited by examiner

TRACK ASSEMBLY AND A TRACK DRIVEN VEHICLE EQUIPPED WITH SUCH A TRACK ASSEMBLY

CROSS-REFERENCE TO RELATED APPLICATIONS

This application is the U.S. National Phase under 35. U.S.C. § 371 of International Application PCT/SE2019/050409, filed May 8, 2019, which claims priority to Swedish Patent Application No. 1850644-4, filed May 28, 2018. The disclosures of the above-described applications are hereby incorporated by reference in their entirety.

TECHNICAL FIELD

The present invention relates to a track assembly for a track-driven vehicle, wherein the track assembly is arranged to hold a front and a rear wheel, of which one is driving, a plurality of carrying wheels about which wheels a continuous track travels, and wherein the track assembly has a track-carrying beam, one of which is elongated and is terminated by a first respectively a second gable end.

The present invention also relates to a track-driven vehicle, comprising a power source, a centre beam, which extends in a longitudinal direction of the vehicle, a first track assembly and a second track assembly, arranged on each side of the centre beam and bedded on the centre beam, wherein the respective track assembly comprises a track-carrying beam, a driving wheel, a plurality of carrying wheels and a continuous track that travels upon and around said driving wheel and carrying wheels, a power-transmitting arrangement for transmitting power from said power source to the driving wheel that is comprised in each of the track assemblies, wherein the power-transmitting arrangement comprises an engine provided in connection with the respective track-carrying beam and a transmission arrangement that is coupled to the engine and which is coupled to the driving wheel belonging to the track-carrying beam for driving thereof.

A track-driven vehicle means a vehicle that drives on a foundation of one or more continuous tracks, which are arranged in a track assembly as described above. The track-driven vehicle may be of the single type, comprising only one vehicle unit of the tandem type, comprising a front vehicle unit and a rear vehicle unit, which are then hingedly connected to each other. One of said vehicle units or both of these vehicle units can be configured in conformity with the principle on which the present invention is based, thus being provided with track assemblies as will be described here. One vehicle unit can be carrier of a power source, which is used for driving a track assembly belonging to said one vehicle unit or the second vehicle unit.

PRIOR ART

In the prior art technique, for instance the one described in SE 538 232 C2, it is known to provide a drive train (engine and transmission device) in a track-driven vehicle of the tandem type in connection with a track-carrying beam. The engine is an electric engine, from which an output shaft extends and the transmission device comprises a planetary gear, which engages with said output shaft, a transmission device shaft and a an angular gear, which is arranged to engage with a drive shaft that drives a driving wheel.

The electric engine and the transmission device in SE 538 232 C2 is according to an exemplary embodiment arranged in a housing, which is bolted down against a front end of the track-carrying beam and located in front of said front part of the track-carrying beam. According to an alternative embodiment, the electric engine and the transmission device are incorporated in a part that forms a front section of a track-carrying beam, wherein the track-carrying beam in this front section has a dividing plane, which is substantially vertical when the track-carrying beam is in a user position with the vehicle standing on a horizontal plane. By means of a disconnectable shutter, access is given to the dividing plane and the engine and the transmission device. Before mounting and dismounting of the electric engine and/or the transmission device, it is obvious that the known track-carrying beam, seen as a unit, must be divided so that said dividing plane is cleared.

An object of the present invention is to provide a track assembly, whose track-carrying beam that can lodge a drive train comprising transmission device and engine, and which does not require that the track-carrying beam is divided at mounting/dismounting of said components. A further object of the invention is to present a track-carrying beam, which is lightweight and torsionally stiff and in which a drive train can be incorporated for driving of a driving wheel bedded in the track-carrying beam in a simple and service-friendly manner. Another object is to provide a track-driven vehicle with improved springing and thus running properties in terrain through incorporation of a drive train, specifically a longitudinal drive train, in a track-carrying beam.

SUMMARY

An object of the invention is achieved by the track-carrying beam stated in the preamble of claim 1, characterised by it comprising a first compartment, a first opening arranged in the first gable end and with which opening the first compartment can communicate with the surroundings, a housing configured as a unit and in which housing the driving wheel is rotatably held and accommodated, a projection from the housing, in which the transmission device for driving said driving wheel is accommodated, wherein the first opening allows the housing's projection and hence the transmission device to be retentively accommodated in the track-carrying beam by being inserted into the compartment. It should hereby be understood that the part of the track-carrying beam that defines the compartment forms part of a continuous piece, which implies that mounting and dismounting of the transmission device can thereby be carried out without having to divide the track-carrying beam through the exposure of any dividing plane. In other words, this part of the present track-carrying beam is devoid of any form of division and a connection that a division requires. Thereby, substantially improved torsional stiffness and strength are obtained not just in this part of the track-carrying beam, but also in it overall because it can be retained in one single piece.

According to an embodiment, the track-carrying beam is configured as a case structure with an inner compartment, extending in the longitudinal direction of the beam. Due to the case structure, a structure is obtained with a combination of a high degree of torsional stiffness and low weight. Due to the compartment of the track-carrying beam, components that are comprised in a drive train to drive a wheel included in the track-carrying beam, specifically by way of positive locking, is sustained in an integral and retaining manner in the track-carrying beam.

According to an embodiment, the first gable end in which the first opening is provided is equipped with an engagement means arranged to engage with corresponding engagement means of the housing, in which the driving wheel is bedded.

According to an exemplary embodiment, the track-carrying beam has a second compartment and a dividing wall, which separates the first-mentioned compartment from the second compartment, whereby a port is arranged in said dividing wall for driving a shaft between the first compartment and the second compartment.

The object of the invention is also solved by a track-driven vehicle according to the preamble of the independent claim 12, characterised in that the track-carrying beam of the respective track assembly is a track-carrying beam according to the present invention and that the transmission device belonging to the track assembly is arranged in the compartment that communicates with the surroundings via the opening in the first gable end of the track-carrying beam. The first gable end is preferably a front gable end of the track-carrying beam.

According to an exemplary embodiment, the track-carrying beam comprises an opening in one side of the track-carrying beam, via which opening the second compartment communicates with the surroundings. Given that an engine is positioned in the second compartment, access is obtained to the engine without necessarily dismounting the transmission device.

An object of the invention is also solved by a track-driven vehicle according to the preamble of the independent claim 12, characterised in that the track-carrying beam of the respective track assembly is a track-carrying beam according to the present invention and that the transmission device belonging to the track assembly is arranged in the first compartment that communicates with the surroundings via the first opening in the first end gable of the track-carrying beam. The first end gable is preferably a front end gable of the track-carrying beam.

According to an exemplary embodiment, the transmission device is bedded in a housing, which as an already assembled (pre-assembled) unit, which again is bedded and accommodated in said first compartment.

According to an exemplary embodiment, the track-carrying beam is pivotably held in the centre beam via a carrying arm and the power-transmitting arrangement comprises a pipe for transmission of power from the power source to the engine provided in connection with the track-carrying beam and said pipe extends through the carrying arm. In this manner, the pipe is efficiently protected against external impact, both mechanical and other types of impacts.

According to an exemplary embodiment, the engine is a hydraulic engine. The engine generates a twisting moment on the output shaft extending therefrom, whereby the twisting moment is accommodated by the body or bodies at which the engine is rotationally fixed, i.e. at least either the housing containing the transmission device or the track-carrying beam. The pipe for transmission of power from the power source to the engine is in such case a hydraulic pipe, through which a fluid is led through and from the hydraulic engine. Alternatively, the engine can be an electric engine, wherein the pipe comprises an electric cable.

According to an exemplary embodiment, the power source is an engine device and the power-transmitting arrangement comprises at least one pump driven by the engine device, arranged to pump hydraulic fluid to the hydraulic engine. Further characteristics and advantages of the present invention will appear from the following detailed description of exemplary embodiments.

SHORT DESCRIPTION OF THE DRAWINGS

In the following the present invention is described based on an exemplary embodiment, shown in the accompanying drawing, wherein:

FIG. 4a is a perspective view, showing essential parts of a track assembly with a track-carrying beam according to the present invention, FIG. 4b is an exploded view, showing the parts of the track assembly that are shown in assembled form in FIG. 4a.

DETAILED DESCRIPTION

Figure 1:
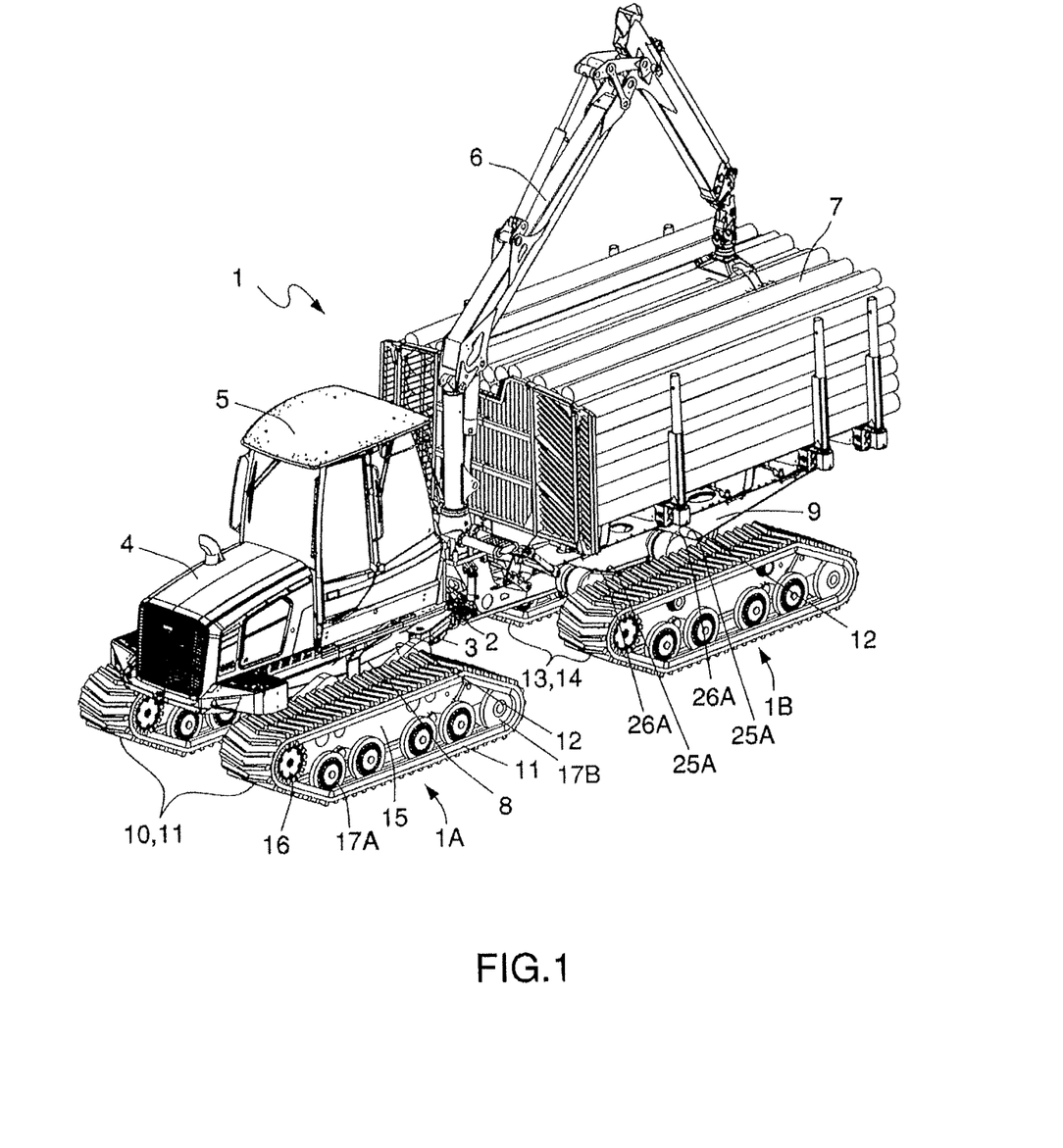
FIG. 1 is a perspective view of a track-driven vehicle equipped with a track-carrying beam according to the invention.

FIG. 1 schematically shows a track-driven vehicle 1, which is articulated (jointed) and includes a vehicle combination, comprising a front 1A respectively rear 1B vehicle unit, which are jointly connected with a control joint 2 or a so-called control swivel joint. The control joint 2 rotates about a vertical rotational axis when the vehicle is on a horizontal plane. The front vehicle unit 1A and the rear vehicle unit 1B can swing laterally relative to each other by means of the control cylinders 3 effective in the control joint 2.

The exemplary track-driven vehicle 1 is constituted by a forest machine in the exemplary embodiment described in the following. More specifically by a vehicle combination in the form of a so-called forwarder, the front vehicle unit 1A of which sustains a superstructure, comprising a propulsion engine 4 and a driving cab 5, and whose rear vehicle unit 1B sustains a superstructure comprising a lifting crane 6 and a cargo compartment 7 for timber.

The front 1A and the rear vehicle unit 1B of the vehicle 1 each comprises a centre beam 8, 9. On opposite sides of the centre beam 8 of the front vehicle unit 1A, a first respectively a second track assembly 10, 11 are arranged and bedded in the centre beam 8 via carrying arms, one of which has reference numeral 12 in FIG. 1. Correspondingly, on opposite sides of the centre beam 9 of the rear vehicle unit 1B, a first respectively a second track assembly 13, 14 are arranged and bedded in the centre beam 9 via carrying arms, which preferably correspond to the carrying arms that are provided in the first vehicle unit 1A and one of which is shown with reference numeral 12.

Figures 3A, 3B:
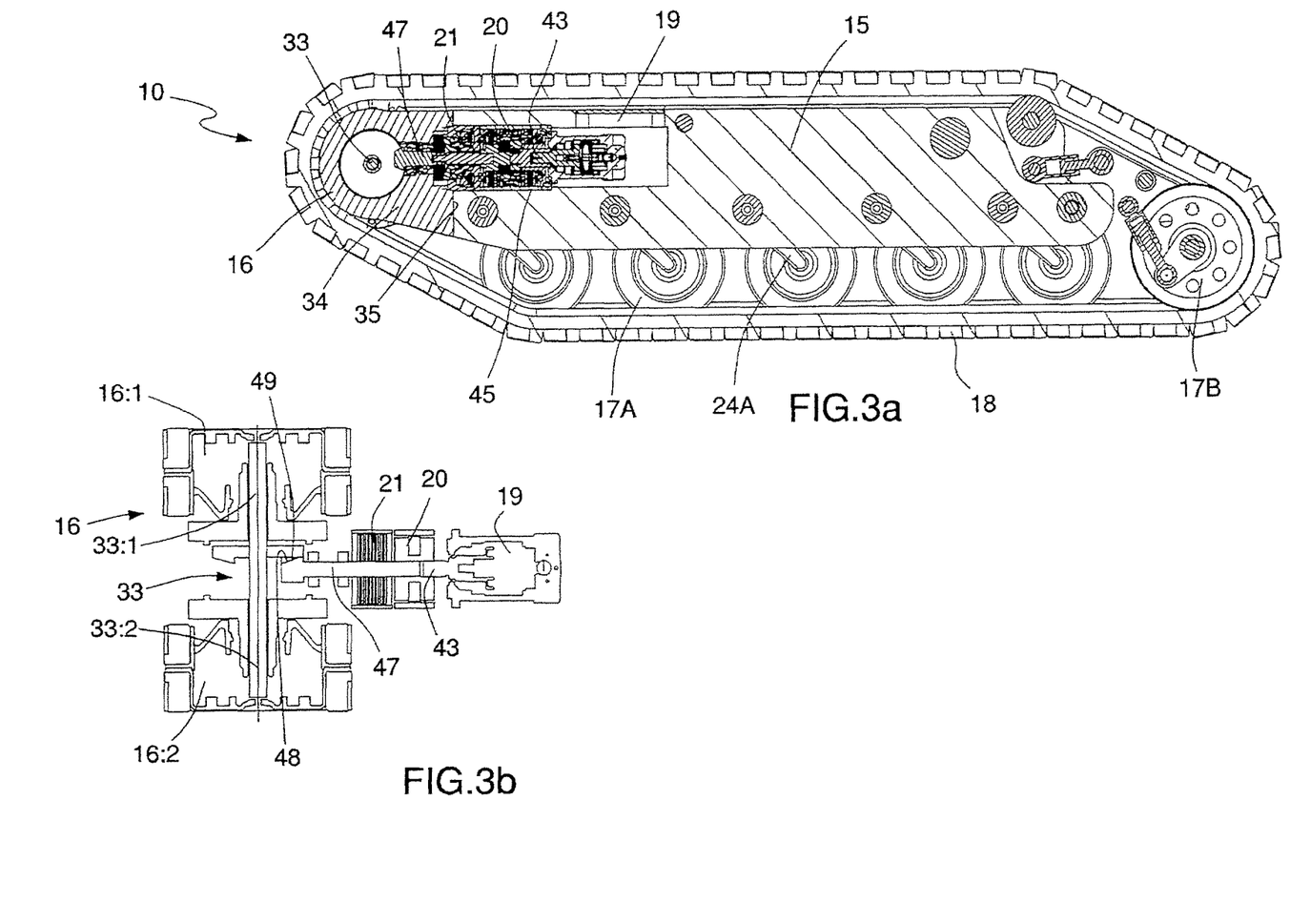
FIG. 3a is a partially cut side view, which shows a track assembly according to the invention equipped with a track-driven beam according to an exemplary embodiment of the present invention.
FIG. 3b is a schematic presentation of a number of components that are included in a track assembly according to an exemplary embodiment of the present invention.

In the following, for clarity reasons, only a track assembly 10 is described in detail, but it is to be understood that one or more, preferably all of the other track assemblies 11, 13, 14 of the vehicle 1, have corresponding construction and function as the track assembly described below. In addition to FIG. 1, a track assembly 10 is also shown in FIG. 3a. The track assembly 10 comprises a track-carrying beam 15, a front driving wheel 16, a plurality of carrying wheels 17A and a rear breaking wheel 17B and a continuous track 18, which travels upon and around said driving wheel 16 and carrying wheel 17.

Furthermore, the track-driven vehicle 1 comprises a power-transmitting arrangement for transmission of power from a power source of the vehicle 1 to the driving wheel 16 that is comprised in the respective track assembly 10, whereby the power-transmitting arrangement comprises an engine 19 arranged in connection with the respective track-carrying beam 15 and a transmission device 20 coupled to the driving wheel 16 belonging to the track-carrying beam 15 for driving thereof. These components are shown in detail in FIGS. 3A and 3B. In connection with the transmission device 20, a brake device 21 is also provided. The engine 19 in the shown exemplary embodiment is a hydraulic engine.

Figure 2:
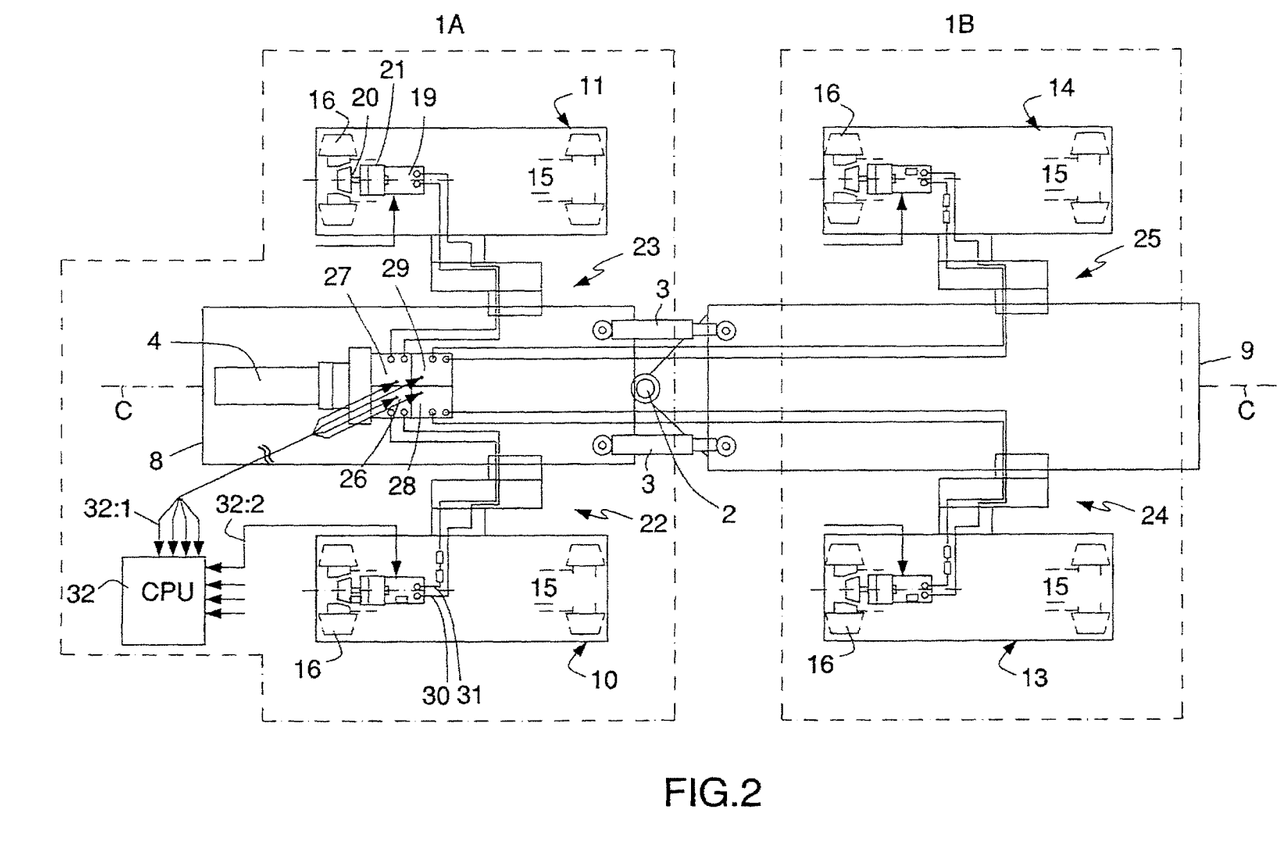
FIG. 2 is a schematic presentation of essential components and their functions in a track-carrying vehicle according to an exemplary embodiment of the invention.

FIG. 2 is a schematic presentation of essential components for driving the engine 19 of the track assembly 10. The vehicle 1 comprises a power source, which here is an engine device, formed by the propulsion engine 4, which suitably for the case of the forest machine described here is a diesel engine. Had the engine 19 of the respective track assembly instead been an electric engine, the power source could either have included an engine device in combination with an electric generator or an electrical energy accumulator. In this case, the power-transmitting arrangement comprises four, a first, a second, a third and a fourth hydraulic circuit 22-25, one for each driving wheel 16 of the respective track assemblies 10, 11, 13, 14. Each hydraulic circuit 22-25 comprises a hydraulic pump 26-29, which is driven directly by the power source-engine device 4. It should be understood that instead of four separate pumps, one pump in combination with a suitably adapted valve package can be used for controlling the flow to the respective hydraulic engine with this. It should be understood that the power-transmitting arrangement obviously comprises the required lines for transmission of power and data between components, also if these, for clarity reasons, are not shown in the drawings.

In the following, only one of the four hydraulic circuits 22-25 are described, but it should be understood that one or more, preferably all of the other hydraulic circuits are arranged in the same manner as the hydraulic circuit 22 described.

Between the hydraulic pump 26 and the hydraulic engine 19, a circuit comprising pipes 30, 31 for inflow respectively outflow of hydraulic fluid to the hydraulic engine 19. The track-carrying beam 15 is pivotably held by the centre beam via a carrying arm 12 and the pipes 30, 31 for transmission of power from the power source to the engine 19 provided in connection with the track-carrying beam extend through the carrying arm 12 and further through the track-carrying beam 15 to the engine 19.

The wheel vehicle's 1 front 1A respectively rear vehicle unit 1B are sustained on said respective track assembly pairs 10, 11; 13, 14. As most clearly appears from FIG. 5, the centre beam 15 is sustained resiliently via a first and second swinging arm device belonging to each track assembly with a type of carrying arm 12.

In the exemplary embodiment described here, this first swinging arm device comprises a first spring suspension, with which the carrying wheels 17A at each end of the carrying wheel rocker arm 24A is pivotably suspended to the track-carrying beam 15. In an alternative embodiment, shown in FIG. 1, this first swinging arm device can be of a simpler rocker arm type. The second swinging arm device comprises a second spring suspension, comprising a combination of a first spring leg 25A and a first suspension rocker arm 26A as well as a combination of a second suspension leg 25B and a second suspension rocker arm 26B, with which combinations the centre beam 9 of the chassis is spring-supported, sustained on a front respectively rear end of the track-carrying beam 20. This means that the rocker arms are arranged in pairs in such a manner that a centre beam 8, 9 sustained on each track assembly pair 10, 11 respectively 13, 14, can be sprung in both its front as well as its rear part.

To control the flow through the hydraulic engine 19 and thereby its rotational speed and output power, the vehicle 1 comprises a schematically shown control unit 32, which is arranged to control the hydraulic pump's 26 output power based on control signals from the operator. The control unit 32 is arranged to control the respective hydraulic pumps 26-29 individually so as to enable optimum powering of the respective track assembly as regards the prevailing driving conditions for the vehicle. The control unit 32 suitably comprises a processor such as a CPU and a memory and is provided with software adapted to control the pumps 26-29 via communication channels 32:1 respectively 32:2 and the hydraulic engines 19 of the vehicle 1.

With reference to FIGS. 3a, 3b and 4a, 4b, a track assembly 10 and the parts of the power-transmitting arrangement associated to this will be described in the following. Particularly the construction of the track-carrying beam 15 will be described as well as how the engine 19 and the transmission device 20 are arranged relative to it.

Figures 4A, 4B:
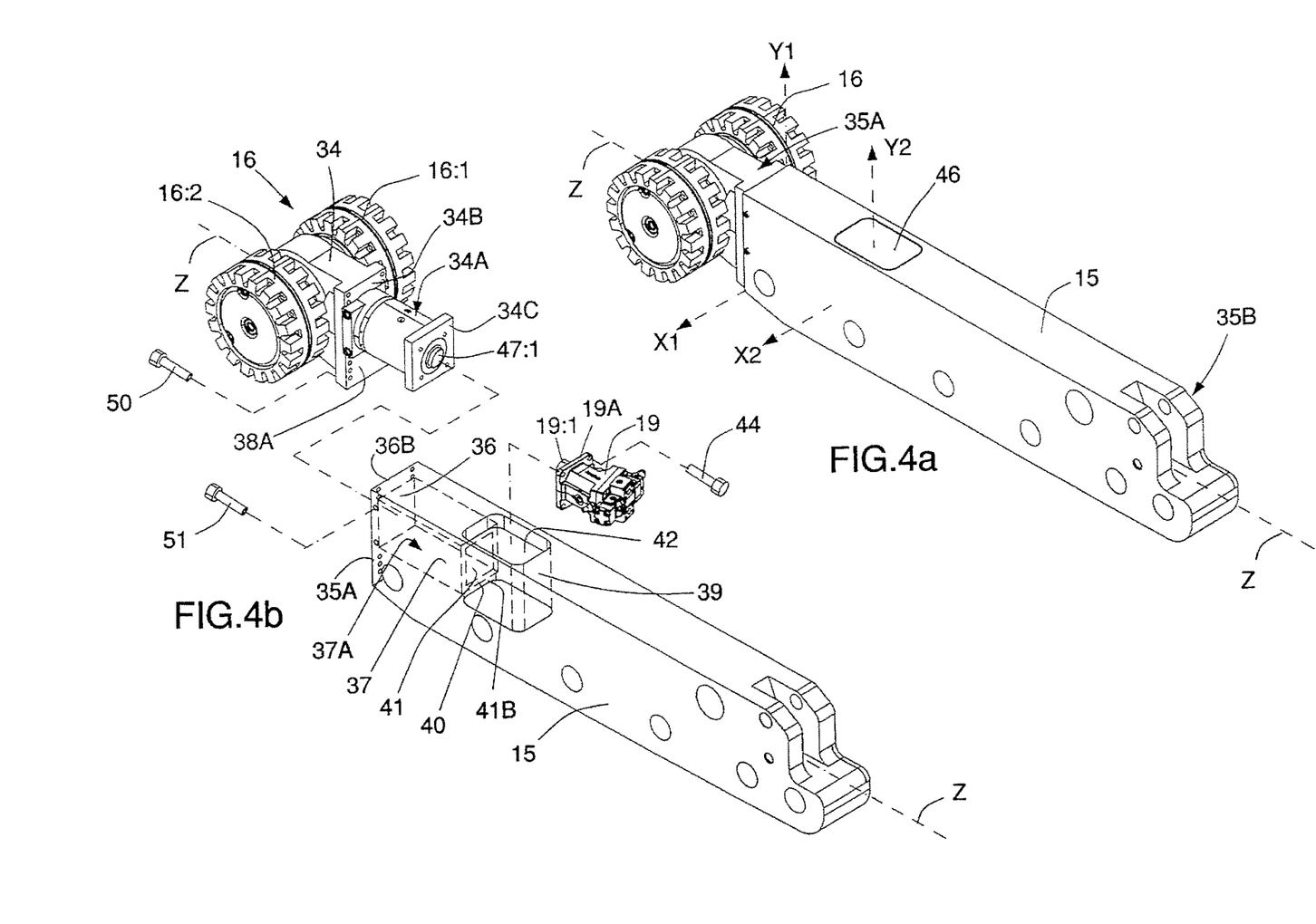

The track-carrying beam 15 is elongated and of the skid beam type and according to an embodiment of the invention constructed in case formation and formed by bonded plate pieces. The track-carrying beam 15 extends along a longitudinal axis Z and is terminated in a first gable end 35A respectively a second gable end 35B. In connection with the track-carrying beam's 15 front first gable end 15A, the driving wheel 16 is provided. The driving wheel 16 is arranged on a drive shaft 33, which extends perpendicularly against the longitudinal direction of the track-carrying beam and substantially parallel to the shafts that carry carrying wheel 17. The drive shaft 33 is bedded in a housing 34, which is bolted down against said first gable end 35A on the track-carrying beam 15.

In the embodiment shown, the driving wheel 16 comprises a driving wheel pair 16:1, 16:2, which respective driving wheels are sustained on an outward part each of said drive shaft 33, namely on a respective shaft 33:1, 33:2, which protrudes in opposite directions from the housing 34. The driving moment of the driving wheels 16:1, 16:2 can advantageously gear up in additional steps via a so-called hub-reduction such as by means of a planetary gear included in the hub of the driving wheel (not shown).

The track-carrying beam 15 has a first opening 36 in its first gable end 35A. The first opening 36 leads into a first compartment 37, in which the transmission device 20 and the brake device 21 are accommodated. The transmission device 20 and the brake device 21 are bedded in a projection of the housing 34 generally denoted 34A. This projection forms a so-called insertion end 34A. The first compartment 37 has a cross section deviating from circularity viewed in the longitudinal direction of the track-carrying beam 15. More specifically, the first compartment 37 has a square cross section. The first opening 36 has a corresponding cross section, both in terms of form and cross-sectional area. The first compartment 37 is configured as a complementarily shaped socket end, generally denoted 37A, against said insertion end 38. Said meeting parts in the form of insertion end 34A respectively socket end 37A have such mutual cross-sectional shape that the transmission device housing 34 can be fitted in the first gable end 35A and be mounted by being injected into the track-carrying beam 15 in its longitudinal axis direction Z.

As most clearly appears from FIGS. 3b and 4a, along part of its length, the insertion end 34A encompasses a transmission shaft 47 onto which the transmission device and the brake device 21 are arranged. FIG. 4b shows how an end of said transmission shaft forms an input shaft end 47:1 to the transmission device accommodated in the housing 34.

In the shown embodiment, the insertion end 34A and the socket end 37A have a cross-sectional shape corresponding to each other in a square formation in such a manner that both parts, fitted to each other (one in the other) offers positive locking.

This means that the insertion end 38A respectively the socket end 37A have such mutual cross-sectional shape that, upon insertion into each other, they offer a positive locking, which not only supports and encompasses, but also locks the meeting sections of said parts against mutual twisting about the longitudinal axis Z of the track-carrying beam.

The track-carrying beam 15 has a first dividing plane X1-Y1, which for mounting of the housing 34 in said first gable end 35A comprises a first fixing flange 36B, which surrounds said first opening 36 and whose support surface for mounting is oriented in said dividing plane X1, Y1 that cuts the longitudinal axis Z of the track assembly.

A second fixing flange 34B is arranged as a portion of the housing 34 and whose support surface for assembly is also the one oriented in said plan X1-Y1, whereby the housing 34 of the transmission device can be fixed onto the first gable end 35A by means of connecting bodies in the form of effective bolted joints 50 respectively 51 between said respective fixing flanges.

Furthermore, the track-carrying beam 15 has a second compartment 39, which is arranged on the opposite side of the first compartment 37 relative to the first opening 36. A dividing wall 40 separates the first compartment 37 from the second compartment 39. The track-carrying beam has a second opening 41 located in the dividing wall 40 via which opening, the first compartment 37 can communicate with the second compartment 39. On one side of the track-carrying beam 15, which forms an upper side of this when it is in the attached position in the vehicle 1, and the vehicle 1 is standing on a horizontal foundation, a third opening 42 is arranged through which the second compartment 39 can communicate with the surroundings.

In the second compartment, the engine 19 is assembled in such a manner that an output shaft end 19:1 extends from the engine 19 through said second opening 41 in the first compartment 37 and wherein said shaft end via a shaft coupling or the like is in motion-transmitting connection with the input shaft end 47:1 of the transmission device 20. Said third opening 42 has a cross section and a size that allow for insertion and attachment of the engine 19 in the second compartment 39.

The track-carrying beam 15 thereby has a second dividing plane X2-Y2, which for mounting of the engine 19 in said first gable end 35A comprises a third fixing flange 41B that encompasses said second opening 41 in the dividing wall and whose support surface 41B for attachment of the engine is oriented in said plane X2-Y2, which cuts the track-carrying beam's longitudinal axis Z. The engine 19 comprises in the known manner a fixing flange 19A whereby said third fixing flange 41B is configured for interaction with the fixing flange of the engine. As most clearly appears from FIGS. 3a and 4b, the present invention offers an integrated drive train longitudinally assembled in the track-carrying beam's 15 compartments 37, 39 for driving the driving wheel 16 in the track-carrying beam.

The engine 19 is fixed onto the dividing wall 40 that divides the first compartment 37 from the second compartment 39 with fasteners that are constituted by nuts 44. In this case, the nuts 44 are injected through the dividing wall 40 and into a fixing flange 34C, which is located at a free end of the insertion end 34A of the part of the housing 34, in which the transmission device 20 is bedded so that said housing 34 or more specifically the insertion end 34A is connected to the engine 19 via the bolted joint that is thus formed. Other means for attachment are also imaginable within the scope of the invention.

In the exemplary embodiment shown, it is not illustrated that the engine 19 and the interior side of the walls that delimit the second compartment 39 can be adjusted so that complementary shape of a positive effect that locks the engine 19 accommodated in the compartment against rotation relative to the track-carrying beam 15. However, the present invention also includes such a solution, as such a solution should be able to reduce or even eliminate the need for further connection in said bolted joint for fixing the drive train integrated in the track-carrying beam 15.

A shutter 46 as indicated in FIG. 4A is suitably arranged to close said opening 42 to the second compartment 39 when the engine 19 is mounted in its position for use in the second compartment 39.

The transmission device 20 suitably comprises a planetary gear 45, with which the output shaft 43 from the engine 20 engages with the interconnection with the input shaft 47:1 of the transmission device. Furthermore, the transmission device 20 comprises an output shaft 47 therefrom, which via a right-angle gear 48 engages with a gear 49 on the drive shaft 33 for driving thereof.

What is claimed is:

1. A track assembly for a track-driven vehicle, which track assembly comprises;
    a track-carrying beam, which extending along a longitudinal axis (Z) is terminated in a first gable end and respective second gable end,
    a front and a rear wheel, one of which is driving,
    a plurality of carrying wheels,
    a continuous track, which can travel around said wheel, and
    a drive train comprising an engine and a transmission device for driving said driving wheel,
    wherein the driving wheel is rotatably bedded and accommodated in a housing and the transmission device is accommodated in a projection from the housing,
    the track-carrying beam comprises a first compartment and a first opening is arranged in the first gable end with which opening the first compartment can communicate with the surroundings, and
    the housing forms a unit, which in a retaining manner is accommodated in the track-carrying beam by means of the projection of the housing being inserted into the first compartment via the first opening.

2. The track assembly according to claim 1, wherein the track-carrying beam comprises a case structure.

3. The track assembly according to claim 1, wherein the housing has an output shaft that carries said driving wheel and an input transmission shaft perpendicularly oriented towards said output shaft.

4. The track assembly according to claim 1, further comprising;
    a first fixing flange that encompassing said first opening has a support surface for mounting, and a second fixing flange arranged as a portion of the housing and having a support surface for mounting, wherein each of said respective support surfaces for mounting of the housing in the first gable end of the track-carrying beam is oriented in one plane (X1-Y1) that cuts the longitudinal axis (Z) of the track-carrying beam.

5. The track assembly according to claim 1, wherein said projection is arranged as an insertion end, and the first compartment is arranged as a socket end onto said insertion end complementarily arranged, said complementary end parts have such mutual cross-sectional shape that said projection can be accommodated in the first gable end by being inserted into the track-carrying beam in its longitudinal axis direction (Z).

6. The track assembly according to claim 5, wherein the insertion end and respective socket end have such mutual cross-sectional shape that, upon insertion into each other, they offer a positive locking, which locks the meeting sections of said parts against mutual twisting about the longitudinal axis (Z) of the track-carrying beam.

7. The track assembly according to claim 6, wherein said insertion end and respective socket end, at least by some part along part of its meeting sections have a cross section deviating from circularity.

8. The track assembly according to claim 1, comprising;
a second compartment in which the engine is accommodated,
a dividing wall that separates the first compartment from the second compartment in the first gable end,
a second opening, which is arranged in said dividing wall, wherein power can be transmitted from the engine to the transmission device via a shaft or shaft coupling travelling through said second opening,
a third fixing flange that encompasses said second opening and has a support surface, which, for mounting of the engine, is oriented in a dividing plane (X2-Y2), cutting the longitudinal axis (Z) of the track assembly.

9. The track assembly according to claim 8, further comprising a third opening in one side of the track-carrying beam, via which third opening the second compartment can communicate with the surroundings.

10. The track assembly according to claim 9, wherein the third opening is arranged in one side of the track-carrying beam, which is intended to form an upper side of the track-carrying beam when it is arranged on a track-driven vehicle, and the track-driven vehicle is standing on a horizontal foundation.

11. The track assembly according to claim 1, wherein the driving wheel comprises a driving wheel pair, each driving wheels is sustained on an output shaft which protrudes in opposite directions from the housing.

12. A track-driven vehicle comprising,
a power source,
a center beam extending in a longitudinal direction of the vehicle,
a first track assembly and a second track assembly, arranged on each side of the center beam and bedded in the center beam, wherein the respective track assemblies comprise a track-carrying beam, a front and a rear wheel one of which is driving, a plurality of carrying wheels and a continuous track that travels upon and around said wheels,
a power-transmitting arrangement for transmission of power from said power source to the driving wheel that is in each track assembly,
wherein the power-transmitting arrangement comprises an engine provided in connection with the respective track-carrying beam and, coupled to the engine, a transmission device, which is coupled to the driving wheel belonging to the track-carrying beam for driving thereof,
wherein each track assembly is of the type as set forth according to claim 1.

13. The track-driven vehicle according to claim 12, wherein the engine included in each track assembly is a hydraulic engine.

14. The track-driven vehicle a according to claim 13, wherein the power source is an engine device, and the power-transmitting arrangement comprises at least one pump driven by the engine device arranged to pump hydraulic fluid to the hydraulic engine.

15. The track assembly according to claim 1, wherein the track-carrying beam comprises a case structure at the first gable end thereof and said first compartment is arranged to extend inwards in the longitudinal direction of the track-carrying beam.

* * * * *